United States Patent Office 3,221,241
Patented Nov. 30, 1965

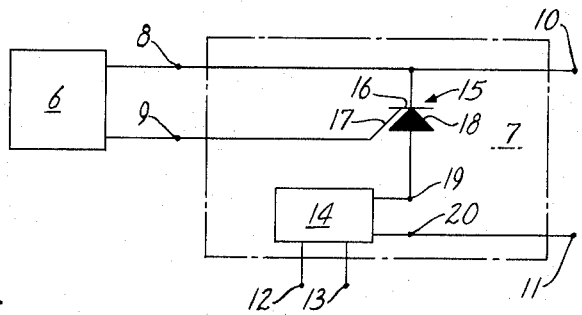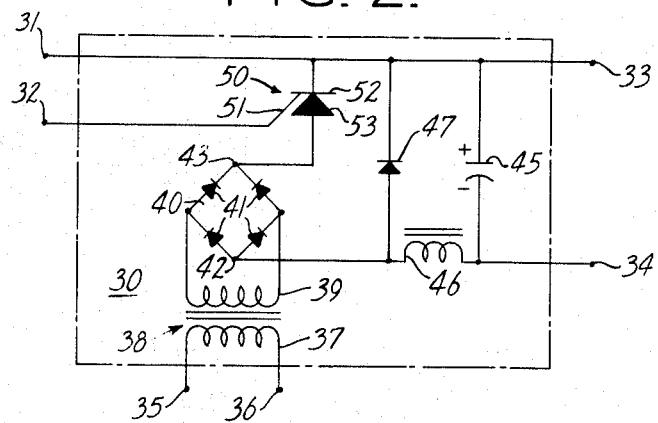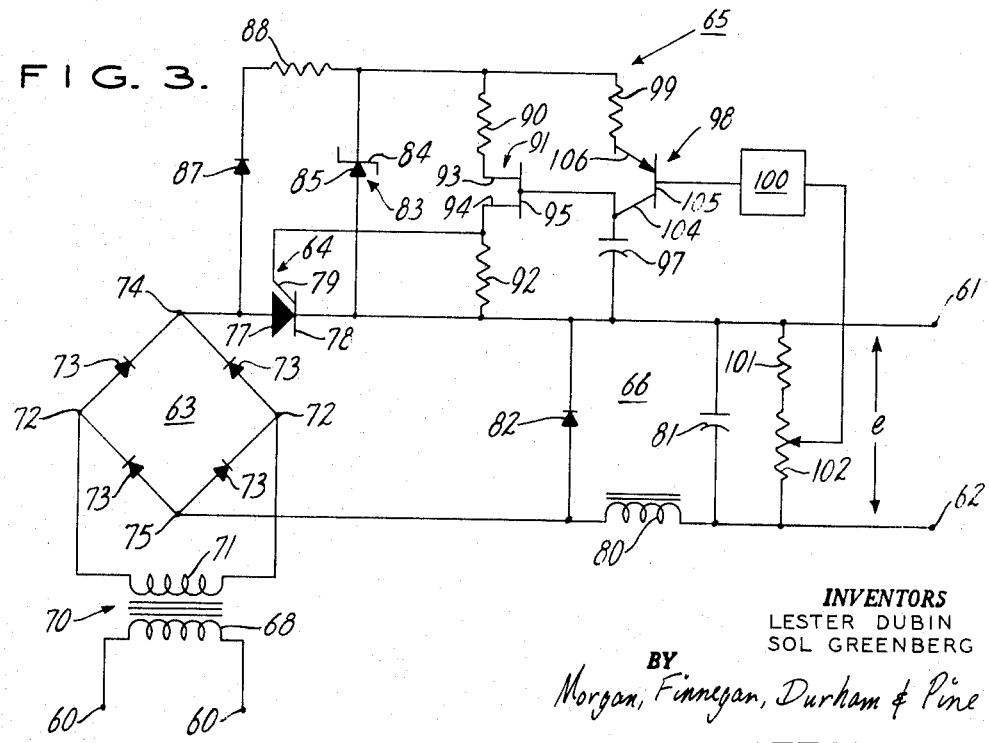

3,221,241
ELECTRICAL POWER CONTROL APPARATUS
Sol Greenberg, Port Washington, and Lester Dubin, Pelham Manor, N.Y. (both of 515 Broad Hollow Road, Huntington, N.Y.)
Filed June 21, 1961, Ser. No. 118,637
15 Claims. (Cl. 321—47)

This invention relates to electrical power control arrangements and more particularly to controlled rectifier means for controlling the translation of electrical signals and electrical power.

It is known to employ controlled rectifiers in various arrangements including switching, power supply and control circuits. In such arrangements it has been the practice to rely on both the rectifying and control characteristics of the controlled rectifier. Thus, as illustrated in the specifications of the type ZJ–39A Silicon Controlled Rectifier,* a typical half wave circuit employs the SCR as the basic rectifying element while a suggested full wave circuit employs two such SCR's to provide one half of the required rectification. Controllability of the SCR is also relied on to provide control over the rectified output. In this connection steps must be taken to avoid the loss of controllability which occurs in an SCR once conduction has occurred.

These circuits have a number of disadvantages. For full wave or polyphase rectifier operation, a plurality of SCR's are required, thus adding expense and complexity to the circuit. In both full wave and half wave applications each SCR is employed for only a fraction of the total input cycle and is therefore not used in a most efficient manner. On the other hand, use of the SCR throughout the cycle raises the problem of the control loss which occurs once conduction is established. In circuits employing capacitance input filters and in circuits where the load includes a battery, cut-off will in general be automatic. In other circuits however, and particularly in those cases where inductive input filters with clamping diodes are used, such is not the case. In addition to the foregoing, peak inverse voltage requirements in present circuits are unduly stringent and where multiple sources feed a common load, there is a current balance problem.

It is thus an object of the invention to provide regulated power supplies having improved means for controlling the amplitude of an electrical signal with the aid of controlled rectifier means.

Another object of the invention is to provide an novel solid state control circuit capable of providing uni-directional electrical power, which power may be controlled or regulated during each cycle of input power by a power carrying, single controlled rectifier.

A still further object of the invention is to provide an improved D.C. power supply, the output voltage of which may be regulated or adjusted in a rapid, precise manner by a circuit which employs a single controlled rectifier to carry load current but does not rely principally on the rectifying characteristic thereof.

A still further object of the invention is to provide such a power supply which makes utilization of a full wave rectifier for extinguishing the controlled rectifier.

Another object of the invention is to provide control circuits which effect greater utilization of controlled rectifiers, which employ these rectifiers primarily for their control functions and which insure restoration of these control functions notwithstanding the periodic loss thereof.

These and other objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

Exemplary embodiments of the invention are described in the specification herein and are illustrated in the drawings, of which:

FIGURE 1 is a schematic diagram useful in illustrating certain controlled rectifier performance in a control circuit;

FIGURE 2 is a schematic diagram illustrating the application of a controlled rectifier circuit to the generation and control of uni-directional power;

FIGURE 3 is a schematic diagram illustrating the invention embodied in a high performance D.C. power supply.

As illustrated in FIGURE 1, the circuit 7 includes control terminals 8, 9, output terminals 10, 11 and power terminals 12 and 13. The power terminals 12, 13 are connected to the input of a stage 14 which is adapted to develop pulses, the amplitudes of which are substantially zero during certain time intervals. These output pulses appear at terminals 19 and 20 of pulse source 14. Terminal 20 is connected to output terminal 11 and terminal 19 is connected to the anode 18 of a controlled rectifier 15. The cathode 16 of the latter is connected to input control terminal 8 and to output terminal 10 while the gate 17 of the rectifier is connected to input control terminal 9. It may be seen from the foregoing that stage 14 is essentially in series with the anode 18 and cathode 16 of rectifier 15 and this combination is connected to the output terminals 10, 11. Accordingly, the output appearing at terminals 19 and 20 of circuit 14 will be caused to flow in the load connected to output terminals 10 and 11 in accordance with the action of rectifier 15; this action is controlled in part by the control signals applied to input terminals 8, 9. These terminals are connected to a rectifier control circuit 6 which may include, for example, means for generating a controlled amplitude signal such as a source and switch, a phase control circuit, or a feedback circuit from outputs 10, 11.

Circuit 14 may comprise a full-wave rectifier energized by an A.C. voltage at terminals 12, 13. It is to be noted that contrary to many present practices, the controlled rectifier 15 is not utilized in this circuit function. The circuit 14 develops uni-directional pulses across output terminals 19, 20. Whether these pulses cause a current flow in the output circuit connected to terminals 10, 11 depends upon the conductivity in the anode-cathode circuit of controlled rectifier 15. If the control signals applied via terminals 8, 9 to cathode 16 and gate 17 are of such a nature as to maintain the rectifier in a cut-off condition, then no current will flow in the output circuit except as provided hereinafter. If, on the other hand, the control signals applied at terminals 8, 9 have an amplitude which insures conduction of rectifier 15, then the pulses developed at terminals 19, 20 will cause a current flow in the load.

The controlled rectifier has known properties such that by applying a signal between the gate and cathode, whereby current flows (in the conventional sense) from the gate to the cathode, then conduction between the anode and cathode will occur provided the voltage across these latter electrodes is slightly above zero (anode positive relative to cathode). In the absence of a gate current, the anode-cathode circuit remains cut-off unless a substantially large voltage, termed the break-down voltage, is applied therebetween. It is assumed in describing the embodiments of the invention that the magnitudes of the voltages applied to the rectifier are such that this break-down voltage is never reached. Thus, the absence of a gate-to-cathode ---
* GE Specification ECG–278A; 12-30-57; rev. 4-16-58.

current signifies that the controlled rectifier is ultimately in its cut-off condition.

Once the control rectifier has been switched into the conducting state, conduction is no longer controlled by the gate-to-cathode signal and cut-off is only achieved by zero-ing the anode-cathode voltage. This property is similar to that which characterizes thyratron tubes.

Returning now to FIGURE 1, it may be seen that if the control signal at terminals 8, 9 is not of such a polarity or magnitude as to cause current flow between the gate 17 and cathode 16 of controlled rectifier 15, then the latter will be cut off and no current will flow in the anode-cathode circuit, notwithstanding the appearance of properly polarized unidirectional pulses at the output terminals of circuit 14. If now, a control signal is applied between terminals 8 and 9 such that a gate-to-cathode current flows in rectifier 15, then the rectifier will be in the conducting state and the uni-directional pulses appearing at terminals 19 and 20 will cause a current flow in the output circuit connected to terminals 10, 11. Whether or not control signal flow is maintained in the rectifier 15 throughout the pulse cycle developed by circuit 14, the rectifier will only cut off during those intervals when the pulse amplitude approaches zero. Of course, if the circuit connected to terminals 10, 11 is capacitive or includes a battery, then rectifier 15 will cut off when the voltage at 19, 20 falls below the voltage at 10, 11. The establishment of the cut-off condition whereby control is periodically restored is insured in the circuit of FIGURE 1 since the rectifier energizing pulses periodically decrease to zero. Moreover, these intervals of zero voltage are small relative to the total cycle period so that the rectifier may be used for carrying load current for substantially the entire cycle. As will be demonstrated below in connection with FIGURE 2, the circuit 14 may include means that further insure cut off of the rectifier 15.

If it is desired to control the amplitude of the pulses delivered to the output circuit through intermediate ranges other than zero and maximum, the control signal may be varied in amplitude periodically such that in the manner of phase control, it achieves a value necessary to cause conduction during a specific period of the cycle which characterizes the energizing voltage derived from circuit 14. Alternatively, the control circuit 6 may switch the rectifier 15 off during a specified number of cycles to thus control the average output.

The controlled rectifier illustrated in FIGURE 1 may be exploited, in cooperation with other elements, to provide D.C. power supply arrangements. Accordingly, an application of this nature to a D.C. power supply is illustrated in FIGURE 2 wherein circuit 30 is provided with control terminals 31, 32, output terminals 33, 34 and power terminals 35, 36. The latter terminals are energized from a source of alternating current, this source being connected to the primary 37 of transformer 38. Connected across the secondary 39 of the transformer is a full-wave bridge 40 comprising four rectifiers 41 which form the legs of the bridge in a conventional arrangement. At output terminals 42, 43 of bridge 40, a full-wave rectified voltage is obtained. Output terminal 43 is connected to controlled rectifier 50, specifically to the anode 53 thereof. It may be seen that the bridge 40 is effectively in series with the rectifier 50 in a manner similar to that illustrated in FIGURE 1. The cathode 52 of the rectifier 50 is connected to control terminal 31 and output terminal 33. Control terminal 32 is connected to gate 51 of rectifier 50. Thus, the control signals applied at terminals 31, 32 determine the energization of the gate-cathode circuit of the rectifier and thus control in part its anode-cathode conduction.

The circuit, as described thus far, functions in a manner analogous to that of FIGURE 1—pulses of current being conducted by the rectifier 50 to the output load in response to the voltage at bridge terminals 42, 43 when the control signals are of proper polarity and magnitude.

To filter these uni-directional pulses so that a substantially D.C. current is obtained, a network is provided which includes capacitor 45, choke 46 and rectifier 47. The capacitor 45 is connected in parallel with the output terminals 33, 34 while choke 46 is serially connected between output terminal 34 and bridge terminal 42. Rectifier 47 is connected across the series combination of controlled rectifier 50 and bridge 40, the anode of rectifier 47 being connected at the junction of bridge terminal 42 and choke 46 and the cathode being connected at the junction of output terminal 33 and cathode 52 of rectifier 50. The function of rectifier 47 is to permit continuous current flow through choke 46 even during those periods when controlled rectifier 50 is in the cut-off state.

The above described filter circuit effectively decouples the A.C. component from the composite controlled rectifier output such that a substantially D.C. voltage of adjustable amplitude appears at terminals 33, 34. The amplitude of this voltage may be controlled as described in connection with FIGURE 1 by controlling the amplitude and/or phase of the control signals applied at terminals 31, 32, as by energizing them from a rectifier control circuit such as described in connection with FIGURE 1.

As in the case of FIGURE 1, there are intervals of time in the circuit of FIGURE 2 during which the control circuit 31, 32, 51, 52 is ineffective with respect to rectifier 50. As shown below, control thereof is nevertheless renewed by this circuit and rectifier 50 periodically extinguishes during those intervals when the series-applied pulses derived from bridge 40 are in the zero magnitude region. It may also be observed that rectifier 50, like its counterpart 15 in FIGURE 1, does not function in the rectification provided by bridge 40 but is rather used primarily for its control characteristics.

Under certain conditions which relate to the wave shape of the energizing pulses, and the action of the filter current, it is possible that the controlled rectifier will not properly extinguish. This possibility is circumvented by virtue of certain inherent properties in the bridge circuit 40 of FIGURE 2. It may be seen in that circuit that the net anode-cathode voltage appearing across control rectifier 50 comprises the sum of the voltage developed across the bridge output terminals 42–43 and the voltage across rectifier 47. Alternatively this net voltage comprises the sum of the bridge rectifier voltage and the voltages appearing across choke 46 and capacitor 45. If transient magnitudes are considered in evaluating this net voltage, it will be seen that during the interval when the voltage at terminals 42–43 tends to be minimum, the voltage across rectifier 47 has some small magnitude resulting from conduction therethrough under the influence of choke 46. This voltage is of a polarity which would tend to maintain a conducting potential across the controlled rectifier 50. However, during the interval in question there is also a residual voltage (charge) appearing across rectifiers 41 of bridge 40 by virtue of a voltage storing property thereof and this voltage is of a polarity which tends to extinguish controlled rectifier 50. The voltage across rectifiers 41 is of a larger magnitude than the voltage across rectifier 47 and accordingly exercises the dominant effect, thus causing anode 53 of controlled rectifier 50 to become negative relative to cathode 52. This net negative voltage insures that the controlled rectifier will extinguish during each cycle. The effect of this negative voltage may be supplemented by a diode circuit, or a diode and capacitance circuit connected between terminal 43 and anode 53 in substitution for the illustrated direct connection.

Thus the desirable filtering provided by the filter 80, 81, 82 may be realized while at the same time, the periodic cut-off of the controlled rectifier in synchronism with the bridge output pulses, is insured.

By way of observing the application of the invention to a power supply which converts alternating current into a regulated D.C. output, reference may be had to FIG- URE 3. This circuit is adapted to be energized by A.C. at terminals 60 and to deliver a regulated and adjustable D.C. voltage at output terminals 61 and 62. Included in this circuit is a bridge rectifier 63, controlled rectifier 64, a control and regulating circuit 65, and a filter 66.

The alternating current applied at terminals 60 causes energization of primary winding 68 of transformer 70 and the resultant voltage introduced in secondary winding 71 is applied across input terminals 72 of bridge 63. The bridge comprises four rectifiers 73 which form the legs of the bridge. The resultant circuit develops a pulsating uni-directional voltage output across terminals 74 and 75.

The bridge output is effectively applied serially to controlled rectifier 64. Thus bridge output 74 is connected to anode 77 of rectifier 64 while cathode 78 thereof is connected to one output terminal 61. The other output terminal 62 is connected via choke 80 to the other terminal 75 of bridge circuit 63.

It may be seen that the organization of elements described thus far are comparable to those illustrated in FIGURE 2. The same may be said for the filter section 66 which includes the choke 80 and a capacitor 81, the latter being connected across the output terminals 61, 62. A rectifier 82, the counterpart of rectifier 47 of FIGURE 2, is connected across the combination of the choke 80 and capacitor 81.

For controlling rectifier 64 a circuit 65 is employed which functions to both regulate the output and to provide adjustment of the same.

Circuit 65 will be described first by assuming that it is initially in a quiescent condition and then by tracing its reactions as the input pulse generated at terminals 74, 75 rises from some nominally low value to a higher positive value. Thus, as the voltage at terminals 74, 75 rises, there is a corresponding rise in the voltage across the anode 77 and cathode 78 of rectifier 64. This rising voltage produces a related rising voltage across a Zener diode 83, this diode being effectively connected across the controlled rectifier since the diode anode 85 is connected to cathode 78 of the controlled rectifier while the diode cathode 84 is connected via resistor 88 and limiting rectifier 87 to the anode 77 of the controlled rectifier. At some voltage value, which depends upon the characteristics of the Zener diode, voltage breakdown thereof occurs after which the voltage across this diode remains constant. This voltage acts as a source voltage for the series combination of capacitor 97, transistor 98 and resistor 99. Accordingly, capacitor 97 tends to charge through the collector-emitter circuit of transistor 98 and resistor 99 to a value corresponding to the voltage across Zener diode 83. Since capacitor 97 is coupled to terminals 94 and 95 of a uni-junction 91 via a resistor 92, then the rising capacitor voltage will produce a related rise at the uni-junction. When this related voltage achieves some predetermined fraction of the Zener voltage (which energizes terminals 93 and 94 of the uni-junction via resistors 90, 92) then conduction between terminals 94 and 95 of uni-junction 91 occurs causing capacitor 97 to discharge through these terminals and the combination of resistor 92 and the gate-cathode circuit of rectifier 64. This gate current causes the controlled rectifier to conduct. Hence, each time uni-junction 95 conducts, a control signal is applied to the controlled rectifier causing it to conduct.

The particular instant of time at which rectifier 64 conducts relative to the input cycle at terminals 74, 75 depends upon the circuit constants and also upon the resistance in the charging path of capacitor 97. This resistance includes the emitter-collector resistance of transistor 98. Accordingly, by controlling this resistance the capacitor charging rate may be controlled thereby controlling the conduction period of rectifier 64. Thus circuit 65 comprises means for generating a variable time trigger for controlling rectifier 64, which means include a variable RC charging circuit or oscillator having a voltage sensitive switch such as uni-junction 91.

Control over transistor 98 in the circuit 65 depends upon the curent flow in base 105 thereof supplied via the coupling circuit 100 from a voltage divider connected across output terminals 61, 62. The divided consists of the series connection of resistor 101 and potentiometer 102. Considering first that the potentiometer 102 remains at a predetermined setting, the above circuit connections are such that a tendency for changes in the output voltage produce corresponding changes in the emitter-collector circuit of transistor 98. These changes are in such a direction and to such a degree as to vary the charging rate of capacitor 97 to thereby vary control over rectifier 64. This control change corrects the tendency for the output voltage to vary, thus providing automatic regulation. The above circuit is also functional in providing adjustment of the output voltage amplitude since a change in the setting of potentiometer 102 will change the amplitude of the output voltage in accordance with the actions just described. Coupling circuit 100 is designed to match the output of potentiometer 102 to the requirements of transistor 98 and may thus include impedance transforming means.

The invention in its broader aspects is not limited to the specific mechanisms shown and described but departures may be made therefrom within the scope of the accompanying claims without departing from the principles of the invention and without sacrificing its chief advantages.

What is claimed is:

1. An adjustable D.C. power supply adapted to be energized from an A.C. source and to supply D.C. load current to a load comprising a rectifier pulse circuit including diodes connected to said source for developing large amplitude pulses of one polarity having a periodically relatively smaller residual value of opposite polarity, a controlled rectifier having an anode-cathode circuit energized by said pulses and adapted to supply a D.C. output to output terminals, a filter circuit including a serially connected inductance and a diode, said diode being connected across said pulse circuit and said controlled rectifier, and a gate circuit connected to the gate of said controlled rectifier for controlling the same to thereby control said output, said relatively smaller residual values of pulses serving to assist in extinguishing said controlled rectifier.

2. A supply as claimed in claim 1 including regulator means connected between said gate circuit and said output terminals for regulating the conduction of said controlled rectifier during each pulse period to correct the effects of load fluctuations from cycle to cycle of said A.C. source.

3. A supply as claimed in claim 1 including an oscillator synchronized with said A.C. source and included in said regulator means for supplying energizing pulses to said gate circuit.

4. An electronic D.C. power supply adapted to be energized from an A.C. source, to supply current to a circuit constituting a substantially resistive load, and to regulate the output from the supply to said load comprising a full wave rectifier circuit including a plurality of semi-conductive diodes, a passive filter, an output terminal, a feedback circuit, and a controlled rectifier having an anode, cathode and gate, said gate being adapted to receive control signals for controlling said controlled rectifier, said full wave rectifier being energized from said A.C. source and being serially connected to the anode-cathode terminals of said controlled rectifier, whereby load current pulses flow in synchronism with said A.C. source through said controlled rectifier, said filter being connected to said resultant series circuit, said output terminal being connected to said filter and said output terminal being connected to said gate via said feedback circuit for supplying said control signals to regulate said output.

5. A supply according to claim 4 in which said filter comprises an LC circuit which includes a diode.

6. A D.C. power supply as set forth in claim 4 in which said feedback circuit includes gate generating means synchronized with said A.C. source and responsive to said output for supplying said signals to said gate.

7. A D.C. power supply as set forth in claim 6 in which said full wave rectifier comprises said plurality of semiconductive diodes in bridge configuration.

8. A D.C. power supply as set forth in claim 6 in which said gate generating means is also responsive to manually controlled means for adjusting the said output.

9. An electronic, automatically regulated A.C.-to-D.C. power supply adapted to supply an output to a circuit constituting a load and to regulate said output, comprising full wave rectifier means including a plurality of rectifiers energized by said A.C. for developing periodic power pulses, an output terminal, a controlled rectifier having a gate-cathode circuit and an anode-cathode circuit, said anode-cathode circuit being connected in serial relation to said power pulse developing means and to said output terminal for conducting load current, gate control means including a time varying voltage generating means, said control means being coupled to said gate-cathode circuit and responsive to said output for generating a variable time trigger pulse for automatically controlling said controlled rectifier in accordance with said output to thus provide automatic regulation.

10. A regulated supply as set forth in claim 9 in which said pulse developing means comprise a full-wave bridge rectifier.

11. A regulated supply according to claim 9 in which said gate control means comprise a variable RC circuit and voltage responsive switch means responsive to said RC circuit, said RC circuit being responsive to said output and said switch means being effectively coupled to said gate.

12. A regulated supply according to claim 9 in which said generating means are synchronized with said A.C.

13. A regulated supply according to claim 12 including means interconnecting said generating means and said anode-cathode circuit for synchronizing said generating means.

14. A regulated A.C. to D.C. power supply comprising a full wave rectifier adapted to be energized by said A.C., an output terminal adapted to be connected to a variable power consuming load, a load current carrying controlled rectifier having a gate-cathode circuit and an anode-cathode circuit energized by the ouput of said full wave rectifier and connected to said output terminal, a source of reference potential, a resistive-capacitive circuit in charging relationship therewith, said resistance being responsve to the output supplied to said load, and pulse responsive means interconnected with said resistive capacitive circuit for generating a control voltage for said gate-cathode circuit to control the conduction time of said controlled rectifier as a function of the output supplied to said load.

15. A supply according to claim 14 including filter means connected to said anode-cathode circuit and in which said source of reference potential is periodically attenuated in synchronism with said A.C.

References Cited by the Examiner
UNITED STATES PATENTS

| | | | |
|---|---|---|---|
| 2,693,568 | 11/1954 | Chase | 321—18 |
| 2,698,416 | 12/1954 | Sherr | 323—22 |
| 2,751,549 | 6/1956 | Chase | 321—18 |
| 2,976,474 | 3/1961 | Dodge | 323—22 |
| 3,005,946 | 10/1961 | Thompson | 323—22 |
| 3,018,432 | 1/1962 | Palmer | 323—66 |
| 3,074,008 | 1/1963 | McPhail et al. | 323—22 |
| 3,095,534 | 6/1963 | Cockrell | 321—46 |

OTHER REFERENCES

G.E. S.C.R. Manual: First Edition, copyright Mar. 21, 1960, page 100 to page 102.

Electronics: Solid State D.-C. Switched Regulators by Albert A. Sorenson, Nov. 25, 1960, pages 121–123.

LLOYD McCOLLUM, *Primary Examiner.*

ROBERT L. SIMS, *Examiner.*